Nov. 16, 1943.  R. B. HUMPHREY  2,334,411
DRIVING AID FOR MOTORISTS
Filed Aug. 21, 1941
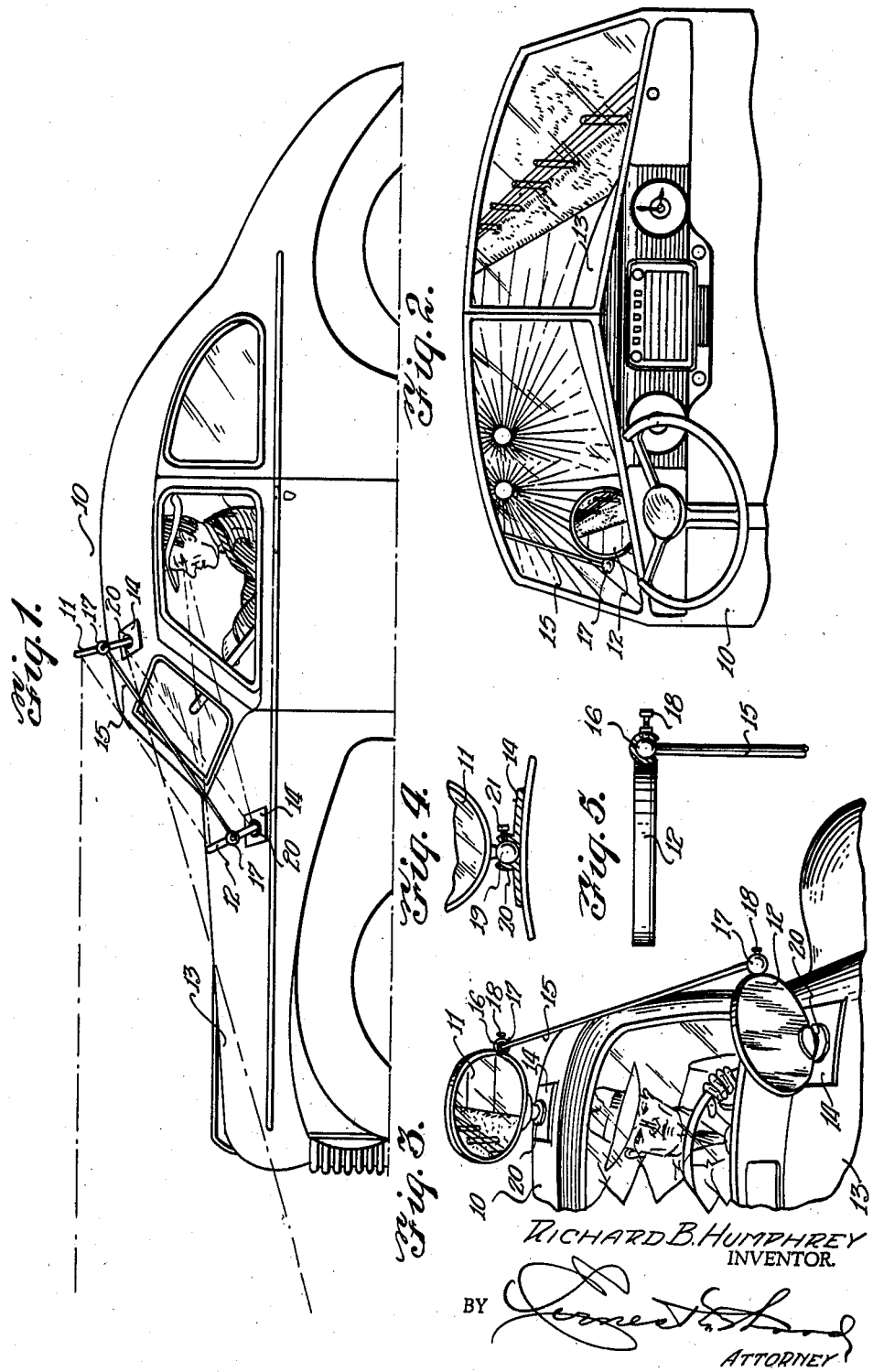
Richard B. Humphrey
INVENTOR.
BY
ATTORNEY Patented Nov. 16, 1943

2,334,411

UNITED STATES PATENT OFFICE 2,334,411

DRIVING AID FOR MOTORISTS

Richard B. Humphrey, Dallas, Tex.

Application August 21, 1941, Serial No. 407,741

1 Claim. (Cl. 88—86)

This invention relates to automobile vehicle accessories and it has particular reference to a device for alleviating the glare of approaching headlights to minimize hazards of night driving.

The principal object of the invention is to establish before the eyes of a motorist, by means of relatively focused mirrors, a reflected counterpart of that part of the roadway over which the vehicle is traveling, the arrangement of mirrors being such that the headlight beam of an approaching vehicle intersects the line of reflection and therefore does not interfere with a clear vision of the road in front of the motorist on whose vehicle the device is installed.

Another object of the invention is to provide a pair of mirrors, one of which is adapted to be mounted on the top of a vehicle, immediately above the driver's station, the other being mounted on the vehicle hood or cowl and in focus with the first mirror to receive an image of the road in front of the vehicle as reflected by the first mirror and since the first mirror or reflecting surface is not so positioned as to reflect the beam of an approaching vehicle headlight, that reflecting surface which is in view of the motorist will enable the latter to discern his portion in front and the shoulder of the road over which he is traveling without the discomforting effects of the glare of the approaching lights.

Another object of the invention is to provide through specular reflection, a medium by which deviated vision of a road to be traveled may be effected, out of the effective range of approaching headlight beams, thereby to avoid the glare thereof.

Another and important object of the invention resides in its adaptability for daytime driving, in that it possesses a periscopic effect, thus affording a motorist prevision of conditions beyond rises in terrain which he is approaching.

Still another object of the invention is to provide means for adjusting the reflecting elements, one with the other and each with its mounting for focusing and the further provision of means for stabilizing the elements to minimize vibration.

With the foregoing objects as paramount, the invention has certain features of accomplishment, to become manifest as the description proceeds, taken in connection with the accompanying drawing wherein:

Figure 1 is a side elevational view of a vehicle with the invention installed thereon.

Figure 2 is an elevational view through the windshield of a vehicle from the driver's position, showing the image of the road in one of the reflecting surfaces.

Figure 3 is a fragmentary view of a vehicle from the front showing another position of the reflecting elements, somewhat enlarged.

Figure 4 is a fragmentary detail view of one of the reflecting elements showing its mounting in cross-section and Figure 5 is an edge view of one of the reflecting elements, showing one form of connection between the two reflecting elements.

Continuing with a more detailed description of the drawing, reference is primarily made to Figure 1 wherein is shown the automobile 10, on the top of which is mounted a reflector or mirror 11, which may be hereinafter referred to as the primary reflector. The secondary reflector 12 is mounted on the hood 13 of the automobile and is so aligned with the primary reflector 11 as to reveal therein the image reflected in the primary reflector.

The mountings 14 of the reflectors may be of any desired form or character and may be affixed to the vehicle body in any suitable manner to insure rigidity as by welding or by screws, but in event it is not desired to disturb the metal surface of the body, the mountings may be cemented in place.

It is necessary that the reflectors themselves be as rigid as possible and held against vibration so that the reflected image will be clear and distinct. One form of means for stabilizing the reflectors is shown and is comprised of a rod 15, on either end of which is a ball 16, receivable in a socket 17 mounted on the edge of each reflector. It is obvious that any relative adjustment of the reflectors within a definite range can be effected through this medium and when the reflectors are properly focused, set screws 18 are tightened to maintain the adjustment.

It is also necessary to adjust the reflectors with respect to their mountings. This is effected in an analogous manner by means of the balls 19 (Fig. 4) and sockets 20, with set screws 21.

It is apparent from the foregoing that the driver, seated as shown in Figures 1 and 3, may observe in the secondary reflector 12 an image of the highway in front of his car at any point he may desire by the initial focusing of the reflectors. In the absence of an arrangement such as described, the driver, when confronting glaring headlights, is required to strain his vision to discern the road to the right of his car to insure against running off the same or collision with the approaching car. There occurs a momentary blindness subsequent to passing glaring headlights and to avoid this, the invention provides that the motorist is not required to peer into the approaching headlights, thereby to measure his safe driving range but instead, he is enabled to observe this without eyestrain, in the secondary reflector, and after passing, his eyes are not required to again accustom themselves to the comparative darkness as would otherwise be the case.

In daylight driving, as well as night, the invention has the advantage of warning the motorist of the approach of a vehicle over the crest of a hill, the primary reflector being disposed well above the normal line of vision. The image of the approaching vehicle will be discernible in the secondary reflector before it is perceived by normal vision. For daylight driving, however, it may be necessary to readjust the reflectors inasmuch as a different focus is required for night driving.

Manifestly, the construction as shown and described is capable of some modification and such modification as may be construed to fall within the scope and meaning of the appended claim is also considered to be within the spirit and intent of the invention.

What is claimed is:

In a driving aid for motorists, the combination comprising a pair of clear vision mirrors, each having a base on which the mirror is mounted for swivel movement, one of said bases being affixed atop a vehicle with its mirror focused forwardly thereof, the other of said bases being affixed to the vehicle forwardly of and in the line of vision of a motorist, with its mirror focused on said first mirror, a rod connecting said mirrors for relative adjustment whereby the images reflected in said first mirror will be altiscopically revealed in said second mirror to visibly warn said motorist of conditions rendered otherwise invisible by terrain irregularties and light beams forwardly of said vehicle and means for securing said mirrors against displacement relative to their bases and to each other.

RICHARD B. HUMPHREY.